United States Patent Office 3,594,471

Patented July 20, 1971

3,594,471
NOVEL ADJUVANT VACCINE AND METHOD OF PRODUCING THE SAME

Ellis Hertzberger, Weesp, and Roderick Louis Stephens, Amsterdam, Netherlands, assignors to U.S. Philips Corporation, New York, N.Y.
No Drawing. Filed Nov. 13, 1968, Ser. No. 775,509
Claims priority, application England, Nov. 13, 1967, 51,507/67
Int. Cl. C12k 5/00
U.S. Cl. 424—89 8 Claims

ABSTRACT OF THE DISCLOSURE

An adjuvant vaccine is provided wherein a dry antigenic material is dispersed in a dry oily vehicle.

The invention relates to a novel type of adjuvant vaccine. Known adjuvant vaccines consist of antigenic materials, such as toxoids, killed bacteria, or inactivated virus or combinations of these, an emulsifying agent, water, and a suitable oily vehicle, such as mineral oil. Such adjuvant vaccines have advantages over aqueous vaccines, producing a higher antibody producing activity and a sustained activity and having a lower immediate local toxicity. There are, however, also disadvantages for instance lack of predictability of storage stability.

The adjuvant vaccine according to the invention comprises a dispersion of dry antigenic material in a non-toxic oily vehicle.

The advantages of the new type adjuvant vaccines according to the invention are that they have a relatively long shelf life similar to that freeze-dried vaccine and further that may be free of emulsifying agents, the introduction of which can produce a toxic hazard.

The dry antigenic material is understood to include natural antigenic material such as pollen and the product resulting from the drying of an antigenic aqueous liquid by any of the processes known in the art, such as freeze-drying and drying over a desiccant.

The invention may be practised to produce adjuvant vaccines of toxoids, of bacteria of viruses and pollen to be used in men and/or animals. The invention is of particular importance for the preparation of adjuvant vaccines containing more than one antigen.

The following viruses, bacteria, toxoids and mycoplasmas for humans and/or animals may be used to produce the adjuvant vaccines according to the invention.

(a) Virus: influenza virus A and B

Human:
- Para influenza
- Adeno
- Respiratory syncytial
- Poliomyelitis (Salk)
- Rubeola
- Rabies
- Rubella
- Arbo
- Ornithosis
- Trachoma Animal:
- Hog cholera
- Foot and mouth (cattle, hog)
- Influenza (horse)
- Distemper (dog)
- Rabies
- New Castle disease
- Infectious hepatitis
- Pan leucopenia (cat)

(b) Bacteria

Human:
- Typhoid
- Paratyphoid
- Cholera
- Pertussis
- Parapertussis
- Plague

Animal:
- Brucella (cattle, sheep, goat)
- Anthrax (cattle, horse, sheep)
- Erysipelothrix (hog)

(c) Toxoids

Human:
- Diphtheria
- Tetanus
- Botulinus

Animal:
- Tetanus (d) Mycoplasmas

Human:
- Mycoplasma penumonia
- Bronchopneumonia (chicken)

The invention is in particular suitable for producing adjuvant vaccines of a combination of one or more of the above given antigens.

As oily vehicle use may be made of any oily substance having a favourable history as an injection fluid for medical or veterinary use. Examples of suitable oils are: almond oil, sesame oil, castor oil, olive oil, arachis oil, pharmaceutical grade mineral oil, perhydro squalene (squalane) and isopropyl myristate. In particular very favourable results have been obtained with the latter product.

The particle size of dry antigenic material should not be larger than 60 microns. Preferably the particle size is between 7 and 20 microns.

The proportion of the amount of dry antigenic material to the oily vehicle can be rather wide. The limits are conditioned by the requirements of the treatment that is to say that the administration of a normal amount of adjuvant vaccine should give sufficient protection. This depends very much on the type of antibody producing agent. Although the vaccine according to the invention may contain nothing else than the finely dispersed antigenic material and the non-toxic oily vehicle, it is also allowable to include certain auxiliary substances. Generally speaking such substances can be added during the different steps which are necessary to manufacture the adjuvant vaccine according to the invention. Thus the adjuvant vaccine according to the invention may contain:

(a) stabilisers, which are added to a liquid suspension or solution of antigen before drying in order to prevent loss of potency during drying;

(b) surface active agents which facilitate and/or improve the dispersion by changing the contact angle between the dried antigen and the oily vehicle;

(c) a substance which eliminates the effects of traces of water which can be picked up during the preparation of the suspension.

Examples of stabilisers are plasma extenders such as dextran, modified gelatine of controlled molecular weight, papain digested protein, polyhydric alcohols, e.g. mannitol, sorbitol, inositol, arabinol; carbowaxes of the polymerised polyoxyethylene glycol type having a molecular weight between 4,000 and 6,000, polyvinyl pyrrolidone.

The amount of stabiliser to be added varies from compound to compound but is in the order of 0.1–10% by weight calculated on the liquid suspension or solution of antigen to be dried.

Suitable surface active agents are in general of the water in oil type. Examples of such substances are cholesterol, mannide mono-oleate. The preferred quantity of the surface active agent is not more than 2% calculated on the weight of the dried antigenic material and stabiliser.

The choice of substance which should reduce the effects of the presence of traces of water depends on the choice of the oily vehicle. Thus if isopropylmyristate is used as the oily vehicle, the preferred substance is ethanol, but when the oily vehicle consists of arachis oil, then the preferred substance is a polymerised polyoxyethylene glycol having a molecular weight between 4,000 and 6,000.

The adjuvant vaccine can suitably be prepared by freeze-drying an aqueous vaccine in the accepted manner, grinding the thus obtained freeze-dried material under waterfree conditions, and dispersing the ground vaccine into a non-toxic substantially waterfree oily vehicle.

The adjuvant vaccine according to the invention may be prepared according to methods known per se. Thus the well-known techniques for freeze-drying aqueous vaccines are applicable for preparing the starting materials. After freeze-drying the dry material is ground in a known manner. To prevent loss of activity of the antigenic substances it is preferred to grind the freeze-dried vaccine in the presence of the oily vehicle which serves as a medium for the dispersion.

The amount of oily vehicle to be added to freeze-dried antigenic material before grinding is rather arbitrary. In general that quantity should be used that the product resulting from the grinding process can be characterized as a paste. Normally such a paste will contain from 20–50% by weight of solid material.

Grinding should be carried out under conditions of low relative humidity and with materials which are as dry as possible. In general the water content of the adjuvant vaccine according to the invention should not be higher than 0.1%. There is a danger that the particles stick together during grinding when the dry antigenic material contains more water than the said percentage, making it difficult to prepare a homogeneous dispersion which does not clog the needle of the syringe on administration.

EXAMPLE

To an influenza virus vaccine of normal composition, having a haemagglutinating potency of 500 C.C.A./ml., is added dextran (M.W. 40.000) 2% (w./v.) and this material is dried from the frozen state. The freeze-dried product can be readily reconstituted with aq. dest. and after reconstitution has a haemagglutiating potency of 290 C.C.A.

The dry material is ground under sterile and low-moisture conditions in dry isopropylmyristate. After grinding the average particle size is less than 15 micron. The equivalent of 1.500 C.C.A. in the original suspension (3 ml.) is taken up in 1 ml. of isopropylmyristate and after grinding diluted by adding more isopropylmyristate until a concentration of 300 C.C.A. (original vaccine)/ml. has been reached. The average particle size has 15 microns. This is the adjuvant vaccine which can be injected in a quantity of 0.25 ml./injection via the intramuscular route.

What is claimed is:

1. An adjuvant vaccine comprising a dispersion of dry antigenic material in a dry non-toxic oily vehicle consisting essentially of isopropyl myristate.

2. The adjuvant vaccine of claim 1 wherein the antigenic material is a freeze-dried aqueous vaccine.

3. The adjuvant vaccine of claim 1 wherein the dispersion is substantially free of auxiliary substances.

4. An adjuvant vaccine as claimed in claim 1 characterized in that the average size of the dispersed antigenic material is less than 60 microns.

5. An adjuvant vaccine as claimed in claim 1, characterized in that the average size of the dispersed antigenic material is between 7 and 20 microns.

6. An adjuvant vaccine of claim 1 comprising a dispersion of dry antigenic material originating from pollen, a virus, a bacteria, a toxoid or a mycoplasma or a plurality or a mixture thereof in a dry non-toxic oily vehicle.

7. An adjuvant vaccine of claim 1 comprising a dission of dry antigenic material being at least one member of the class concisting of (1) typhoid, paratyphoid, cholera, pertussis, parapertussis, plague, Brucella Anthrax and Erysipelothrix bacteria, (2) diphteria, tetanus and botulinus toxoids, (3) poliomyelitis (Salk), influenza, para influenza, adeno, respiratory syncytial, rubeola, rabies, rubella, arbo, ornithosis, trachoma, hog cholera, foot and mouth, rabies, New Castle Disease, infectius hepactitis, pan leucopenia viruses and (4) mycoplasma pneumonia and broncho pneumonia mycoplasmas, having an average particle size of less than 60 microns in a dry non-toxic oily vehicle.

8. An adjuvant vaccine comprising a dispersion of freeze-dried aqueous influenza vaccine, having an average particle size of less than 60 microns in dry isopropylmyristate.

References Cited

UNITED STATES PATENTS

| | | | |
|---|---|---|---|
| 2,853,797 | 9/1958 | Graham et al. | 34—5 |
| 2,897,600 | 8/1959 | Graham et al. | 34—5 |
| 3,378,443 | 4/1968 | Cooper et al. | 424—89 |
| 3,449,885 | 6/1969 | Starkey | 53—22 |

OTHER REFERENCES

Platcow et al.: J.A.PhA. 43: 690–692 (1954), "A Study of the Adaptability of Isopropyl Myristate for use as a Vehicle for Parenteral Injections."

SHEP K. ROSE, Primary Examiner

U.S. Cl. X.R.

34—5; 88, 91, 92, 424